United States Patent [19]
Lieb et al.

[11] Patent Number: 5,855,931
[45] Date of Patent: Jan. 5, 1999

[54] VACUUM FORMING APPARATUS

[76] Inventors: Nathaniel Howard Lieb, 311 Wynne La., Narberth, Pa. 19072; Joseph Alexander Lieb, 530 S. 2nd, Philadelphia, Pa. 19147

[21] Appl. No.: 603,782

[22] Filed: Feb. 20, 1996

[51] Int. Cl.[6] .................................................. B29C 51/010
[52] U.S. Cl. ...................... 425/388; 425/3; 425/DIG. 48; 425/DIG. 60
[58] Field of Search ........................... 425/388, DIG. 48, 425/DIG. 60, 3

[56] References Cited

U.S. PATENT DOCUMENTS

| 3,649,152 | 3/1972 | Knack, Sr. | 425/388 |
|---|---|---|---|
| 3,852,014 | 12/1974 | Kimball et al. | 425/388 |
| 3,962,392 | 6/1976 | Conner, Jr. | 425/388 |

*Primary Examiner*—Jay H. Woo
*Assistant Examiner*—Robert Hopkins

*Attorney, Agent, or Firm*—John Shaw Stevenson

[57] ABSTRACT

A vacuum forming apparatus to allow a tray containing a sheet, to be molded into a prescribed shape, to be moved manually in a very rapid manner in a rearward diagonal upward direction from a horizontally positioned vacuum table that is at one level into horizontal engagement with a heating element that is at a higher level, When in this latter position the tray is retained by a magnet until the sheet is heated to a moldable condition. The tray is then manually withdrawn from the magnet without harm to an operator's fingers while the tray is being moved rapidly in a forward diagonal downward direction away from the heating element into engagement with the vacuum tables In this position the moldable sheet is formed into the prescribed molded shape. To accomplish this very rapid diagonal movement of the tray parallel linkages are employed that are each pivotally connected to the rear central portion of the tray at one end and to a post at its other end.

8 Claims, 3 Drawing Sheets

VACUUM FORMING APPARATUS

DESCRIPTION OF PRIOR ART

Prior art vacuum forming apparatus have been devised that employ mechanisms connected for moving a tray containing a moldable plastic sheet about a stationary member into contact with a heating element and then moving it away from the heating element in a downward direction into engagement with a work piece that is on a vacuum table. This mechanism has not been satisfactory because it prevents horizontal surface to surface contact from occurring when the tray is brought into engagement with the heater or work piece on the vacuum table. This horizontal surface to surface engagement is necessary because if this type of contact does not occur, as is the case with this prior art, then the heating element will not be able to apply the required strong amount of intense heat to the sheet to place it in a condition to be molded into the form of the work piece nor will the full value of the vacuum dispensed from the vacuum table be able to apply a sufficient vacuum to the sheet to force it into a properly molded condition about the work piece.

In an attempt to overcome the aforementioned deficiency another prior art type of vacuum forming apparatus has been devised that employs stationary vertical guide poles along which an operator can move a tray containing a moldable sheet in a vertical upward direction into contact with a heating element to place the sheet into a moldable state and then in a vertical downward direction into engagement with a vacuum unit positioned in a lower portion of the apparatus. This vertical guide pole construction is detrimental because while the tray is manually moved in the aforementioned up and down direction an undesired, harmful amount of intense heat will be radiated against the hands of an operator.

It is an object of the present invention to provide a vacuum molding apparatus that does not require the use of a time consuming clamping operation that has heretofore been required in the aforementioned prior art devices to engage a tray carrying a moldable sheet with a heating element when it is moved upwardly along guide poles to a heating position and thereafter to be disengaged when these parts and the sheet are sufficiently heated and are moved downwardly away from the heater element on the poles toward a vacuum table.

It is furthermore another object to disclose a vacuum forming apparatus that not only eliminates the aforementioned clamping and unclamping operations but which will thereby shorten the time it takes for a vacuum forming apparatus to perform a molding operation.

The advantage of the unique dual pivoted linkage disclosed herein over prior art vacuum forming apparatus is that this linkage allows movement of the tray in a diagonal direction away from the heating element so that the operator's fingers, which engage gripping parts on the side of the tray, will be located outside the area where intense heat is emitted and will therefore not be harmed.

SUMMARY OF THE INVENTION

It is an object of this present invention to employ in a vacuum forming apparatus a dual pivoted linkage between a tray that retains a moldable sheet therein and a stationary post so that the tray can be rotated in an upward rearward diagonal direction and then into flush surface to surface horizontal engagement with a heating element and can thereafter be rotated in a downward forward diagonal direction toward and into flush surface to surface horizontal engagement with a portion of the top of a vacuum table that is purposely positioned beyond the outer end of the heater element.

It is another object of the invention to employ a dual pivoted linkage of the aforementioned type that will allow an operator to move the tray rapidly in an upward rearward diagonal direction and in a downward forward diagonal direction as it is moved respectively into and out of engagement with the aforementioned heating element and vacuum table without his hands being harmed by the intense downwardly directed heat radiated by the heating element.

It is another object of the present invention to disclose a vacuum forming apparatus of the aforementioned type which can utilize vacuum base plates, custom trays, night guards, sports mouth guards, temporary splints, fluoride treatments, trays, coping and other appliances as work pieces to be molded.

It is another object of the invention to provide a dual pivoted linkage for a vacuum forming apparatus that provides a mechanism to move its tray between its heater element and vacuum in a more rapid manner than any of the aforementioned prior art devices.

It is another object of the invention to provide a magnet on a stationary post of a vacuum forming apparatus that will retain the linkage and tray that is connected thereto in a stationary position when the tray is engaged with the heating element during the softening of its the moldable sheet rather than utilizing the prior art practice of having the fingers of an operator hold the tray thereby exposing them to harm due to the intense heat radiating from the heating element.

BRIEF DESCRIPTION OF THE DRAWINGS

The foregoing and other objects, aspects and advantages will be better understood from the following detailed description of a preferred embodiment of the invention with reference to the drawings in which.

DETAILED DESCRIPTION OF THE INVENTION

Figure 1:
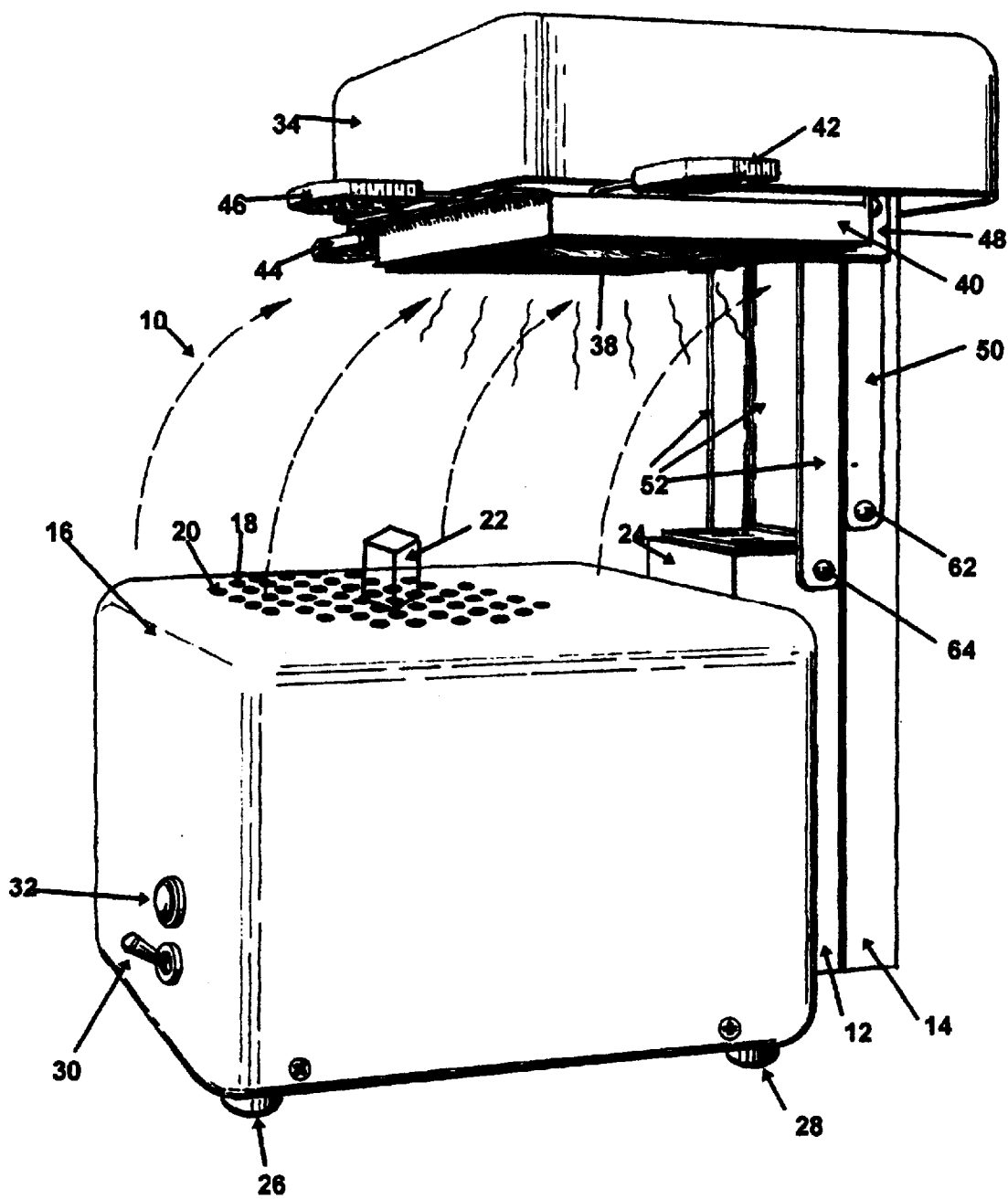
FIG. 1 is a prospective view of the vacuum forming apparatus and shows its dual pivoted linkages are in when its movable tray and its associated moldable sheet are in flush surface to surface contact with a heater element.

FIG. 1 shows a vacuum forming apparatus 10 which is comprised of a pair of integrally connected stationary posts 12, 14. A vacuum table 16 is shown which has holes e.g., 18, 20 in its top surface so that a vacuum can be applied by a conventional vacuum unit, not shown, within the table 16 to any moldable work piece 22 that is placed thereon. The rear surface of the vacuum table 16 is integrally connected by; e.g., welding it to a lower front surface 24 of the post 12. The vacuum table 16 has a suitable number of cylindrical support feet; e.g., 26, 28 to support the entire weight of the vacuum forming apparatus thereon when placed on a flat surface, not shown. The table 16 is also provided with a switch 30 for turning on and off the vacuum unit within the table. The table also has a light 32 to indicate which of these two conditions are present.

Figure 2:
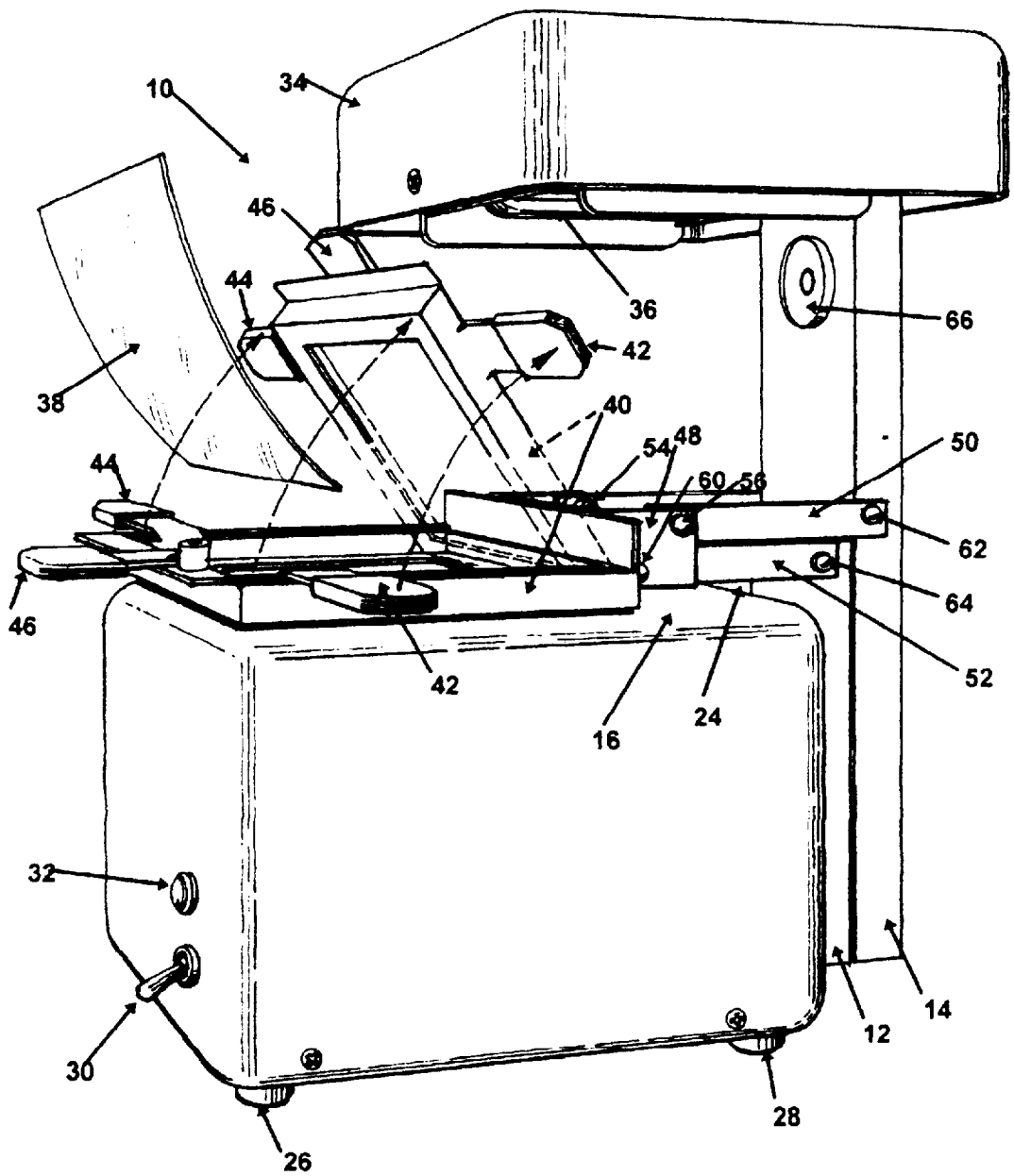
FIG. 2 shows another perspective view in dash line form of the position of the dual pivoted linkages as a moldable sheet is inserted into the tray 40 and further shows the horizontal solid line position that the tray will be in when it has been brought into contact with the top of the vacuum table.

As is best shown in FIG. 2 the stationary post 14 extends in an upward direction and into supporting, engagement with a casing 34 containing a heating element 36. This heating element 36 can be of any conventional type that is generally made use of in vacuum forming devices. FIG. 2 also shows a moldable sheet 38 being mounted in a tray 40. The tray 40 is shown having two fingers 42, 44, that are positioned on the opposite sides on the inner movable portion 41 of the tray 40. Fingers 42, 44 can be moved to the positions 42', 44' and thus provide suitable finger grasping means by which an operator can raise movable portion 41 of tray 40 and ts moldable sheet as shown in FIG. 2. A third gripping finger 46 attached to the tray 42 at a central outermost portion of the tray allows the entire tray 42, including the sheet 38, to be moved in a rearward diagonal direction into and out of engagement with the heating element 36 as shown in FIG. 1 and to lower the tray 40 and its sheet in a forward diagonal downward direction onto the top of the work piece 22.

It is important to note that the front top surface of the vacuum table 16 with which the tray 40 is engaged is positioned at a location that extends in a forward direction away from the front end of the heating element 36.

Figure 3:
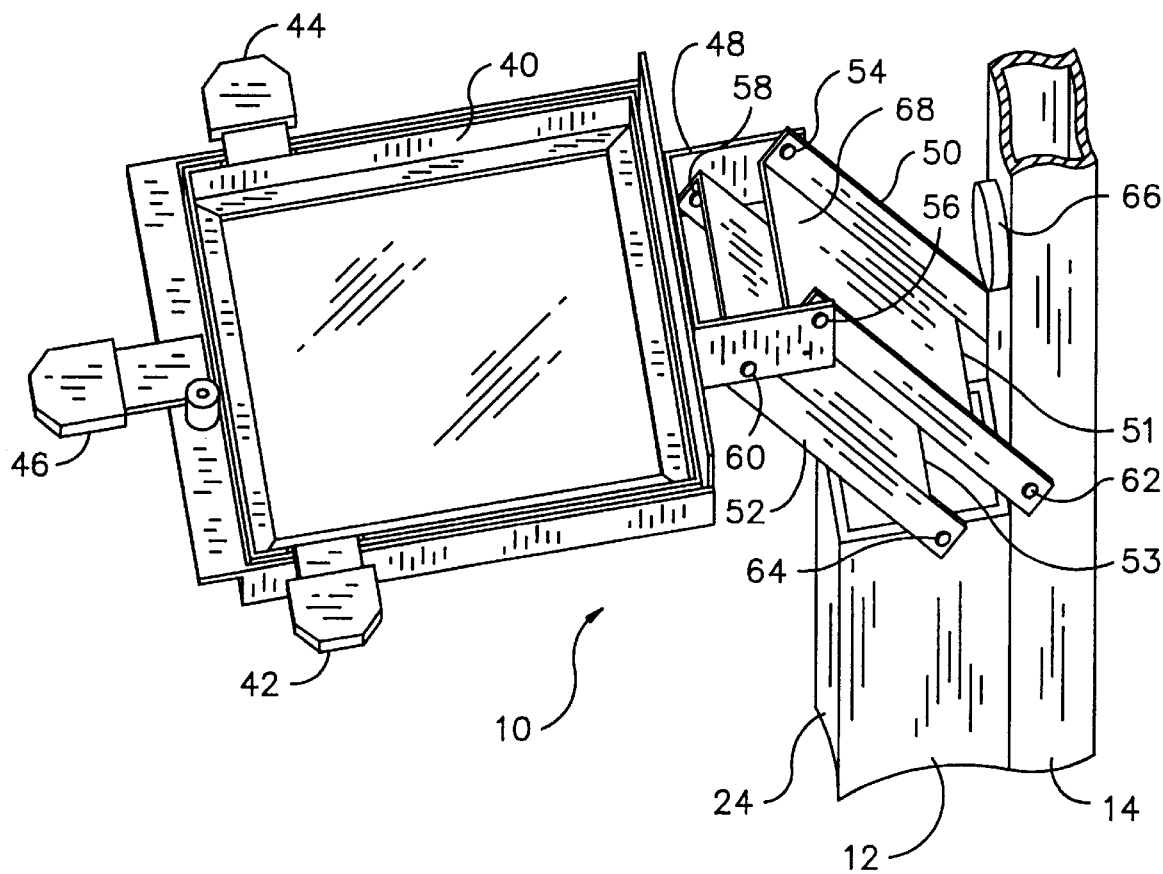
FIG. 3 is a perspective view of the tray and dual pivoted linkage to show their respective positions when they have been moved to a position that is located between the solid line position of these parts as shown in FIGS. 1 and 2.

As is best shown in FIGS. 2 and 3 the tray 40 has a C-shaped part 48 welded in an integral fashion thereto and with its ends projecting therefrom and away from the tray toward the posts 12, 14.

FIG. 3 shows a pair of channel shaped parallel linkages 50, 52. Linkage 50 has a surface that forms a cut back web portion 51 of the channel at an inner end thereof and is pivoted at the outer end of a C-shaped member 48 by means of pivot pins 54, 56. The second linkage 52 has a surface that forms a cut back web portion 53 at the inner end thereof and is likewise pivoted at its inner end to the C shaped member 48 by means of the pivot pins 58, 60. The other inner opposite end of the linkage 50 is shown in FIGS. 1, 2 and 3 having a pivot pin 62 to thereby form a pivotal connection between this linkage 50 and the post 14.

In a similar manner the linkage 52 is shown having a pivot pin 64 to thereby form a pivotal connection between this linkage 52 and the post 12. It should be understood that an additional pin, not shown, is positioned directly opposite the pin 62 on the linkage 50 to provide additional pivotal support between this linkage 50 and the post 14.

Similarly it should be understood that another additional pin, not shown, is positioned directly opposite the pin 64 on the linkage 52 to provide additional pivotal support between this linkage 52 and the post 12.

The dual linkages 50, 52 are purposely made of a channel shape configuration so that the tray 40 that is connected to these channel shape linkages 50, 52 cannot be moved in a right or left lateral direction from its pivotable position on either side of these respective posts 14, 12 but can readily be moved in an upward and downward direction thereon. This channel shape construction for the linkages 50, 52 will thus allow the tray to be brought into the same desired position on the heating element 36 and the top of the vacuum table 16 by using finger gripping part 46 to move these linkages 50, 52 to either of these positions.

From the aforementioned description of the unique dual pivoted linkage 50, 52 it can be seen that after a moldable sheet 38 is inserted into the tray 40 as shown in FIG. 2 the tray 40 is manually moved in an upward direction by the operator grasping finger gripping part 46 and applying an upward movement thereon. This pivotal movement of the linkages 50, 52 about their displaced pivot pins; e.g., displaced pins 62 and 64 and displaced pins 56 and 60 and this will allow the tray 40 to be rotated in a diagonally upward and inward direction and into a horizontal position just before and while it engages the heating element 36. The movement of the tray in this manner will allow the entire horizontal surface of the moldable sheet 38 to be pressed against the heating element 36. The moldable sheet 38 in the tray 40 will then be heated by the heating element 36 so that it can be brought into a pliable condition for a molding operation which follows. When the tray 40 and its associated sheet 38 has been moved to its uppermost inward heating position as shown in FIG. 1., it will be held in that position by a magnet 66 shown in FIGS. 2 and 3. This magnet 66 is positioned on the post 14 so that it will retain the back web shaped portion of the channel shaped linkage 50, the other linkage 52 and the tray 40 attached thereto in the position as shown in FIG. 1 until the sheet 38 in the tray is heated to a condition where it is made pliable for molding.

When an operator depresses the finger gripping part 46 of the tray and overcomes the force of the magnet 66 the operator can then lower the tray 40 and sheet 38 retained therein in a downward diagonal direction and into a horizontal surface to surface engagement with the top of the vacuum table 16 as shown in solid line in FIG. 2. When in this position the moldable sheet 38 can be formed into a molded shape that resembles the work piece 22 of FIG. 1 as a vacuum is generated by the unit in the vacuum table 16 and the moldable sheet 38 is pulled downwardly over the work piece 22. The cube shaped workpiece 22 as shown in FIG. 1. Is merely symbolic of any one of a number of previously mentioned workpieces that can be molded by this curing apparatus.

Summarizing, it can be seen that the unique pivotal positioning of the parallel linkages 50, 52 extending between the tray 40 and the posts 12, 14 thus enables the tray 40 to be raised rapidly in a diagonal inward upward direction and thence into a horizontal surface to surface contact with the heating element 36 and to then be held there by the magnet 66 during a heating operation. It can further be seen that the tray can then be lowered in a diagonal downward direction so that it can be brought into surface to surface contact with the top surface of the vacuum table 16. By employing a magnet to hold the tray while the moldable sheet is heated and by positioning the surface of the vacuum tray at a position that extends away from the outer edge of the heating element, no harm to an operator's fingers can occur due to the intense heat radiating from the heating element.

What I claim is:

1. Apparatus for vacuum forming a moldable sheet comprising: a post, a heating element connected to and extending outwardly away from an upper end portion of said post for heating said sheet, said lower end portion of said post being connected to and supported by a casing containing a vacuum table, said vacuum table being positioned to extend outwardly in the same direction as and beyond the front end of said heating element, a tray positioned on top of said vacuum table and extening outwardly away from said heating element for supporting said sheet thereon, a pair of parallel linkages, each one of said linkages being pivotally connected at one of their end portions to a different part of said post for pivotal movement thereon, the other ends of the linkages being respectively mounted for pivotal movement on different centrally located back portions of said tray, said tray having a finger gripping part that is positioned at the central outer portion of said tray for manually moving said tray and its associated parallel linkages in a diagonal inward and upward direction to bring the tray into contact with said heating element and thereby enable the sheet to be heated to a moldable condition, said finger gripping part being further operable for manually moving said tray and parallel linkages in a diagonal outward and downward direction away from said heating element so that the heated sheet can be rapidly brought into contact with and be formed by said vacuum table into the same shape as a workpiece that is mounted on said vacuum table.

2. The apparatus as specified in claim 1 wherein the cross section of each linkage is of a channel shaped configuration.

3. The apparatus as specified in claim 1 wherein each of said linkages are of a channel shaped configuration and a magnet is mounted on the outer surface of said post in a position to engage a web portion of a first one of said channel shaped linkages when said tray is in contact with said heating element and thereby retain said first linkage, the second linkage and said tray connected therewith in said last mentioned position while said heating element is activated thereby providing a way of preventing the operator's hand from being harmed by the heat of said heating element.

4. The apparatus for vacuum forming a moldable sheet as specified in claim 1 wherein the post is constructed of inner and outer portions that are integrally connected to one another and positioned to face the back surface of said vacuum casing and wherein one of said linkages is pivotally connected to said inner post portion and the other one of said linkages is pivotally connected to the outer post portion.

5. The apparatus for vacuum forming a moldable sheet as specified in claim 1 wherein said tray has an extendable portion thereof that is of a C-shaped configuration to thereby provide a part of the rear central portion of said tray to which each of said linkages is pivotally connected.

6. An apparatus for vacuum forming a moldable sheet as specified in claim 1 wherein said central rear portion of said tray has a base of a C-shaped extension connected thereto and its leg portions protruding therefrom, said C-shaped extension having the end portions of one of said parallel linkages positioned against an upper portion of said legs and the end portions of the other of said parallel linkages being positioned against a lower portion of the legs of said C-shaped member and each of said linkages having pivot pins to retain them in pivotal relationship in their respective upper and lower leg positions of said C-shaped extension.

7. A vacuum forming apparatus comprising: a tray, two integrally connected posts positioned in back of one another and parallel linkages, a first one of said linkages being pivotally connected at one end to an inner central end portion of said tray that is positioned to face said posts and at its other end to one of said posts, said other linkage being pivotally connected to another inner central end portion of said tray at a position that is displaced from said pivotal connection of said first linkage and said other linkage being connected at its other end to the other post, and a moldable sheet positioned in said tray, a finger gripping part mounted on the outer end of said tray, said finger gripping part being operable to move said tray and the sheet retained therein and the parallel linkages upwardly in a diagonal direction toward and into flush surface to surface contact with said heating element and downwardly in a diagonal direction toward and into flush surface to surface contact with said vacuum table for molding the heated sheet into the form of a workpiece that is positioned on said table.

8. A vacuum forming apparatus comprising a post, heating element and a casing containing a vacuum table each connected to said post, said table being positioned at a lower level and in a forward direction away from and beyond said heating element, said post being mounted for support on said casing, a tray positioned on said vacuum table, a finger gripping part connected to and extending away from the central front of the tray and parallel linkages each pivotally connected at one end to said post at a different location from one another and to said tray to thereby restrict the movement of said tray in a diagonal inward and upward direction into engagement with said heater and in an outward and downward direction into engagement with said vacuum table, said finger gripping part being operable by the hand of an operator to manually move the tray into and out of engagement with said heating element without the hand of the operator being harmed by the intense heat of said heating element.

* * * * *